US012072144B2

(12) United States Patent
Tovar Ramos

(10) Patent No.: US 12,072,144 B2
(45) Date of Patent: *Aug. 27, 2024

(54) CRYOGENIC PURIFICATION OF BIOGAS WITH WITHDRAWAL AT AN INTERMEDIATE STAGE AND EXTERNAL SOLIDIFICATION OF CARBON DIOXIDE

(71) Applicant: L'Air Liquide Société Anonyme pour l'Etude et l'Exploitation des Procédés Georges Claude, Paris (FR)

(72) Inventor: Jorge Ernesto Tovar Ramos, Cachan (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 30 days.

This patent is subject to a terminal disclaimer.

(21) Appl. No.: 17/836,139

(22) Filed: Jun. 9, 2022

(65) Prior Publication Data
US 2022/0397345 A1 Dec. 15, 2022

(30) Foreign Application Priority Data
Jun. 9, 2021 (FR) ........................................ 2106091

(51) Int. Cl.
*F25J 3/02* (2006.01)
*B01D 3/14* (2006.01)
*F25J 3/06* (2006.01)

(52) U.S. Cl.
CPC ............ *F25J 3/0233* (2013.01); *B01D 3/143* (2013.01); *F25J 3/0266* (2013.01); *F25J 3/067* (2013.01); *F25J 2200/70* (2013.01)

(58) Field of Classification Search
CPC .......... F25J 3/067; F25J 3/0233; F25J 3/0266; F25J 2220/40; F25J 2220/60; F25J 2210/80; F25J 2220/66; F25J 2215/80
See application file for complete search history.

(56) References Cited

U.S. PATENT DOCUMENTS 3,921,411 A * 11/1975 Gleich .................... F25J 3/0238
62/626
4,152,129 A 5/1979 Trentham et al.
(Continued)

FOREIGN PATENT DOCUMENTS

CA        2 984 085      5/2018
WO    WO 2010 144288    12/2010
(Continued)

OTHER PUBLICATIONS

Yousef, A.M. et al., New approach for biogas purification using cryogenic separation and distillation process of CO2 capture, Energy, vol. 56, May 16, 2018, 328-351.
(Continued)

*Primary Examiner* — Brian M King
(74) *Attorney, Agent, or Firm* — Elwood L. Haynes

(57) ABSTRACT

A combined plant for cryogenic separation and liquefaction of methane and carbon dioxide in a biogas stream, including a mixing means, a compressor, a first exchanger, a distillation column, a second exchanger, a separating means, an expanding means, and a separator vessel. Wherein, the mixing means is configured such that the recycle gas is the overhead vapour stream, and the first exchanger and the expanding means are combined.

2 Claims, 2 Drawing Sheets

(56) References Cited

U.S. PATENT DOCUMENTS

| | | | | |
|---|---|---|---|---|
| 5,062,270 A | * | 11/1991 | Haut | F25J 3/0219 62/929 |
| 5,681,360 A | * | 10/1997 | Siwajek | C07C 7/005 95/149 |
| 5,842,357 A | | 12/1998 | Siwajek et al. | |
| 5,956,971 A | * | 9/1999 | Cole | F25J 1/0202 62/631 |
| 2011/0041550 A1 | * | 2/2011 | Menzel | F25J 3/0242 62/621 |
| 2013/0036765 A1 | | 2/2013 | Renaud | |
| 2013/0167583 A1 | * | 7/2013 | Stallmann | F25J 3/067 62/617 |
| 2013/0205827 A1 | * | 8/2013 | Stallmann | F25J 1/0027 62/606 |
| 2014/0144177 A1 | | 5/2014 | Stallman | |
| 2015/0159945 A1 | | 6/2015 | Valencia et al. | |
| 2015/0174523 A1 | | 6/2015 | Darde et al. | |
| 2019/0001263 A1 | | 1/2019 | Prince et al. | |
| 2019/0186825 A1 | | 6/2019 | Noureldin et al. | |
| 2021/0172677 A1 | | 6/2021 | Terrien et al. | |

FOREIGN PATENT DOCUMENTS

| | | |
|---|---|---|
| WO | WO 2011 135538 | 11/2011 |
| WO | WO 2012 029021 | 3/2012 |
| WO | WO 2016 128110 | 8/2016 |
| WO | WO 2019 122660 | 6/2019 |

OTHER PUBLICATIONS

French Search Report for corresponding FR 2106091, Feb. 14, 2022.

* cited by examiner

CRYOGENIC PURIFICATION OF BIOGAS WITH WITHDRAWAL AT AN INTERMEDIATE STAGE AND EXTERNAL SOLIDIFICATION OF CARBON DIOXIDE

CROSS REFERENCE TO RELATED APPLICATIONS

This application claims the benefit of priority under 35 U.S.C. § 119 (a) and (b) to French Patent Application No. 2106091, filed Jun. 9, 2021, the entire contents of which are incorporated herein by reference.

BACKGROUND

The present invention relates to a plant and a process for producing liquid methane and liquid carbon dioxide from a biogas stream.

Biogas is the gas produced during the degradation of organic matter in the absence of oxygen (anaerobic fermentation), also known as methanization. This may be natural degradation—it is thus observed in marshland or in household waste landfills—but the production of biogas may also result from the methanization of waste in a dedicated reactor referred to as a methanizer or digester.

By virtue of its main constituents—methane and carbon dioxide—biogas is a powerful greenhouse gas; at the same time, it also constitutes a source of renewable energy that is appreciable in the context of the increasing scarcity of fossil fuels.

Biogas predominantly contains methane ($CH_4$) and carbon dioxide ($CO_2$), in proportions which can vary according to the way in which it is obtained, but also contains, in smaller proportions, water, nitrogen, hydrogen sulfide, oxygen, and also other organic compounds, in trace amounts.

Depending on the organic matter that has been degraded and on the techniques used, the proportions of the components differ, although on average biogas includes, on a dry gas basis, from 30% to 75% methane, from 15% to 60% $CO_2$, from 0 to 15% nitrogen, from 0 to 5% oxygen and trace compounds.

After a step of pretreating these contaminants, the biogas can be used as is to supply a boiler or a cogeneration unit, or else purified to obtain a gas which meets the specifications for injection into the natural gas network (e.g.: 3% $CO_2$ max).

In numerous regions of Europe and throughout the world, the natural gas network is not always accessible close to the areas of production of fermentable waste. Furthermore, while there is no need for heat at the biogas production site, depending on the purchase price of electricity, cogeneration does not always have a sufficient output to render profitable the major investment in a digestion unit. It is then advantageous in these two cases to transport the biogas to a distribution or consumption point. The liquefaction of biogas after purification would make it possible to transport biomethane at a lower cost. According to the regulations in certain geographic zones, it is forbidden to release $CH_4$ into the environment; this adds an additional constraint and restricts the choice of biogas separation processes to highly effective methods.

Today, biogas purification processes are mainly based on absorption, permeation or adsorption techniques. These systems then require the addition of a supplementary module in order to obtain biomethane in the liquid form. Moreover, in the majority of cases, the content of $CO_2$ in the biogas at the end of this purification step is still too high to supply such liquefaction systems.

A system of cryotrapping based on the principles of reversible exchangers has been proposed. This system is based on the solidification of the $CO_2$ present in the biogas on a cold surface (trapping), followed by a step of sublimation or liquefaction of the $CO_2$ using a hot source. For a continuous production of biomethane, is then necessary to work with several exchangers in parallel. Their solution makes it possible to separate and liquefy the methane and the $CO_2$ in two separate steps, but it is not possible to recover the cold used in the solidification of the $CO_2$.

Starting from there, one problem that arises is that of providing a method of separating and liquefying methane and $CO_2$ from biogas with a minimum loss of methane and using a minimum number of operations.

SUMMARY

One solution of the present invention is a combined plant for cryogenic separation and liquefaction of methane and carbon dioxide comprised in a biogas stream, comprising:
  a means M1 for mixing the biogas 1 with a recycle gas R,
  a compressor for compressing the mixture to the distillation pressure,
  an exchanger E01 for cooling the compressed mixture,
  a distillation column K01 supplied with the cooled mixture and making it possible to produce methane at the top of the column and a $CO_2$-enriched liquid at the bottom of the column,
  an exchanger E02 for liquefying the methane produced at the top of the column,
  a means M2 for separating the liquefied methane into two portions: a "reflux" portion 6 and a "product" portion 5,
  a means M3 for expanding and heating the $CO_2$-enriched liquid recovered at the bottom of the column and for recovering the cold from the $CO_2$-enriched liquid, and
  a separator vessel V01 for receiving the $CO_2$-enriched stream from the means M3 and for recovering an overhead vapour and liquid $CO_2$ 7,
  a means for withdrawing vapour V1 from an intermediate stage of the distillation column K01,
  a means for partially condensing the vapour V1 and producing a two-phase stream D1,
  a means for reinjecting the two-phase stream D1 into the distillation column K01 at the stage corresponding to the equilibrium temperature,
  with
  the means M1 such that the recycle gas R corresponds to the overhead vapour recovered at the outlet of the separator vessel V01,
  the exchanger E01 and the means M3 being combined, and
  the cryogenic separation unit comprising:
  a distillation column K01 comprising a cold section 2 at the top of the column and a hot section 3 at the bottom of the column,
  a means 4 for physically separating the cold section 2 and the hot section 3,
  at least two containers V04 A/B external to the distillation column, for placing in contact the liquid from the cold section and the vapour rising from the hot section and for trapping all the solid $CO_2$, and
  a device for regenerating the external containers, comprising a means for extracting a fluid from the distillation column K01 which is capable of liquefying the solid $CO_2$, a means for introducing this fluid into the external containers in regeneration so as to bring about the melting of the solid $CO_2$ and a means for reintroducing the resulting liquid $CO_2$-vapour mixture into the distillation column K01.

Depending on the case, the plant according to the invention may have one or more of the following characteristics:
- the means for partial condensation is the exchanger E01;
- the plant comprises, upstream of the means M1, means for drying and desulfurization of the biogas;
- the plant comprises, upstream of the means M1, a means C01 for compressing the biogas to the pressure of the recycle gas R;
- the plant comprises, upstream of the means M1, a means C01E and/or C02E for cooling the biogas to ambient temperature;
- the exchanger E02 is comprised in a closed refrigeration circuit;
- the refrigeration circuit uses methane as refrigerant fluid;
- the distillation column K01 comprises heating at the bottom of the column.

The present invention also relates to a combined process of cryogenic separation and liquefaction of methane and carbon dioxide comprised in a biogas stream, using the plant as defined previously, and comprising:
a) a step of mixing the biogas 1 with a recycle gas R,
b) a step of compressing the mixture to the distillation pressure,
c) a step of cooling the compressed mixture in the exchanger E01,
d) a step of distilling the cooled mixture in the distillation column K01 so as to produce methane at the top of the column and a $CO_2$-enriched liquid at the bottom of the column,
e) a step of liquefying the methane produced at the top of the column in the exchanger E02,
f) a separation step for separating the liquefied methane into two portions: a "reflux" portion 6 and a "product" portion 5,
g) a step of expanding and heating the $CO_2$-enriched liquid recovered at the bottom of the column in the exchanger E01, and of recovering the cold from the $CO_2$-enriched liquid, and
h) a step of separating the $CO_2$-enriched stream resulting from the exchanger E01 in the separator vessel V01 into liquid $CO_2$ 7 and overhead vapour, with the recycle gas R corresponding to the overhead vapour produced in step a), and the distillation step d) comprising the following sub-steps:
i) a sub-step of introducing the methane-carbon dioxide mixture into the bottom of the column,
ii) a sub-step of removing the liquid from the cold section 2 of the distillation column,
iii) a sub-step of removing the vapour from the hot section 3 of the distillation column,
iv) a sub-step of introducing the liquid and the vapour removed from steps b) and c) into at least one container external to the distillation column K01 so as to place them in contact and to trap the solid $CO_2$,
v) a sub-step of regenerating at least one external container, comprising a sub-step of extracting a fluid from the distillation column K01 which is capable of liquefying the solid $CO_2$, a sub-step of introducing this fluid into the external container(s) in regeneration so as to bring about the melting of the solid $CO_2$ and a sub-step of reintroducing the resulting liquid $CO_2$-vapour mixture into the distillation column K01,
vi) a sub-step of recovering methane at the top of the column and a $CO_2$-enriched liquid at the bottom of the column,
vii) a sub-step of withdrawing vapour V1 from an intermediate stage of the distillation column K01,
viii) a sub-step of cooling the vapour V1 in the exchanger E01 so as to partially condense this vapour and to produce a two-phase stream D1, and
ix) a sub-step of reinjecting the two-phase stream D1 into the distillation column K01 at the stage corresponding to the equilibrium temperature.

Note that the withdrawal of vapour V1 then the reinjection of a two-phase stream D1 as described above makes it possible to reduce the reflux at the top of the column which is at a much lower temperature level and is supplied directly by an external source of cold.

Depending on the case, the process according to the invention may have one or more of the features below:
- the process comprises, upstream of step a), drying and desulfurization steps;
- the process comprises, upstream of step a), a step of compressing the biogas to the pressure of the recycle gas R;
- the process comprises, upstream of step a), a step of cooling the biogas to ambient temperature;
- the process comprises, downstream of step h), a step of heating the liquid $CO_2$ so as to vaporize it;
- the heating of the liquid $CO_2$ is performed in the exchanger E01;
- step e) is performed by cooling the produced methane by means of a refrigerant fluid;
- in step b), the mixture is compressed to a pressure of between 7 and 46 bar;
- in sub-step v., the fluid extracted from the distillation column is vapour obtained from a lower section at a higher temperature of the distillation column K01;
- sub-step iv. is performed with control of the temperature in the external container;
- in sub-step v., at least two external containers are regenerated in series.

The process according to the invention makes it possible to separate and liquefy the products of the biogas in a single combined distillation/liquefaction operation. The operating conditions of the products at the inlet and outlet of the column and in the recycle section have been calculated to prevent the formation of solid $CO_2$.

The thermal integration between the streams of the separation section and those of the refrigeration cycle enable the recovery of the cold used in the liquefaction of the $CO_2$ and in the recycling of the liquid methane. It is possible to completely or partly recover the energy used in the liquefaction of the $CO_2$ if this $CO_2$ is not desired as a product or when it can be used in the gaseous state.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

The pretreated biogas 1 (pretreated by drying, desulfurization) is introduced into the process at atmospheric pressure and temperature, it is compressed a first time in a compressor C01, to the pressure of the recycle circuit (around 8 bar). After compression, it is cooled in C01E to ambient temperature with CW (=Cooling Water) or air.

Next, it is mixed with a recycle stream R, the mixture is compressed in a compressor C02, to the pressure of the distillation column (around 15 bar) or more depending on the requirements of the downstream exchanger E01 and it is cooled to ambient temperature in C02E, with CW or air.

Preferably, C01E and C02E are shell and tube exchangers (coolers of the compressors).

The mixture of biogas—recycle stream R is sent to the exchanger E01. The main purpose of this exchanger is to cool the mixture in preparation for the distillation. The mixture can then be expanded or supplied directly to the column where it will be used as reboiler.

If there is no heat source at the bottom of the column, it is necessary to inject the mixture into the bottom to ensure the circulation of vapour from the bottom. If there is a heat source in the bottom of the column (reboiler), the mixture is introduced higher up in the column.

The distillation column KOI separates the methane from the carbon dioxide. The feed for the column is the biogas+ recycle stream R mixture. This feed acts as main reboiler; an additional source of heat may also be used (for example an electrical resistance heater, vapour or a portion of the hot biogas in indirect contact).

The distillation column K01 comprises a cold section 2 at the top of the column and a hot section 3 at the bottom of the column and a means 4 for physically separating the cold section and the hot section.

Figure 2:
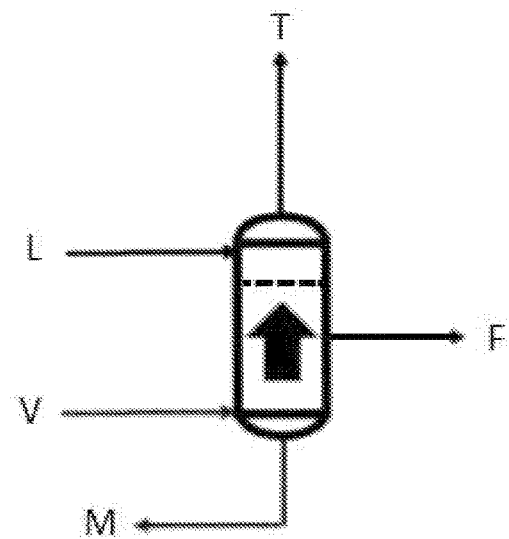
FIG. 2 illustrates further details of FIG. 1, in accordance with one embodiment of the present invention.

The external containers V04 A/B of the distillation column K01 operate in alternating sequences of filling and regeneration, with always at least one container being filled to allow continuous operation of the column, without said column being disturbed by the presence of solids. The formation of solids in the containers will be brought about by controlling the temperature. The $CH_4$-rich cold liquid L coming from the top of the distillation column K01 will have a lower temperature than the equilibrium temperature of $CO_2$ solidification, it will be brought into contact with the rising vapour V (mixture with similar concentrations of $CH_4$ and $CO_2$), the temperature of which is higher than the equilibrium temperature of $CO_2$ solid formation (cf. FIG. 2). The contact of the two fluids will result in a liquid-vapour mixture whose concentrations and temperature are in the range for formation of solid $CO_2$F. The rate of saturation of the container with solids will depend on the process pressure and on the size of the containers.

Melting (regeneration) of the solid $CO_2$ trapped in the external containers will take place by direct contact with a stream of vapour extracted from a lower section of the column at a higher temperature. The resulting liquid-vapour mixture M will be reinjected into a lower stage of the column. And the overhead vapour T will be reinjected into the top of the column.

Figure 3:
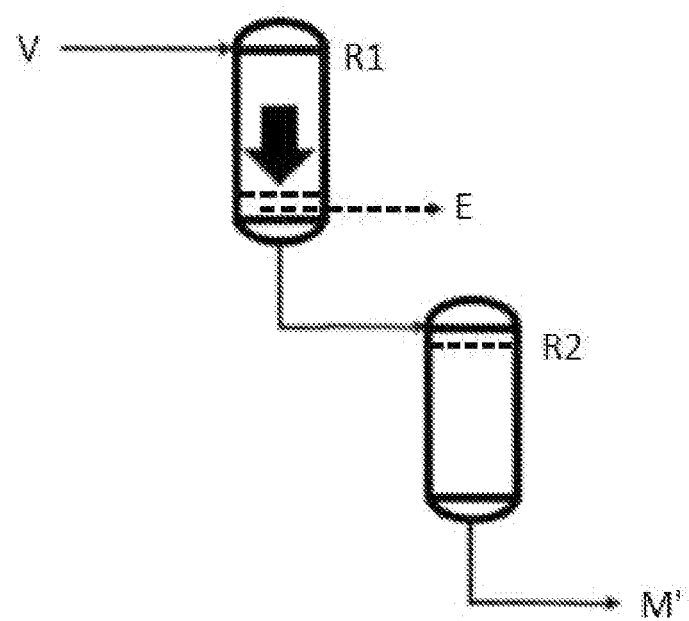
FIG. 3 illustrates further details of FIG. 1, in accordance with one embodiment of the present invention.

At any time, there will be at least two regeneration containers in series (cf. FIG. 3). The first container R1 will be the one providing the main part of the cold, the second container R2 will ensure that the temperature and the liquid fraction of the mixture M' to be reinjected in the column will remain constant in spite of the depletion of solid E in the first container. Once the first container has been completely regenerated, it can be put in service for the formation of solids. The second container will then act as a cold supply and the newly saturated container will be put into regeneration.

Vapour V1 is withdrawn from an intermediate stage of the distillation column K01. This vapour V1 is sent into the exchanger E01 and partially condensed so as to produce a two-phase stream D1. The two-phase stream D1 is reinjected into the column at the stage corresponding to the equilibrium temperature.

The product at the top of the column is pure $CH_4$ in the vapour state. The bottom product is a liquid rich in $CO_2$, containing around 95%-98%.

The methane at the top of the column is liquefied in the exchanger E02, against a fluid from a closed refrigeration circuit. A portion of the methane leaves the cycle as product and the other portion (reflux portion) is used as recycle for the column and reinjected into the top of the column.

The $CO_2$-enriched liquid recovered at the bottom of the column is expanded and heated in the exchanger E01 countercurrent to the biogas—recycle stream R mixture.

The $CO_2$-enriched stream from the exchanger E01 is sent to the separator vessel V01.

The overhead vapour of the vessel V01 is reheated in the exchanger E01 and then mixed with the biogas. It corresponds to the stream previously named "recycle stream R".

The liquid from the bottom of the vessel V01 is the pure $CO_2$. This can, depending on the requirements, leave the process as product or be reheated in the exchanger E01 and in another exchanger E03 of the refrigeration circuit in order to be completely vaporized before leaving the cycle. Note that the pure $CO_2$ could alternatively be reheated and vaporised in the exchanger E03 without passing through the exchanger E01.

The exchanger E01 therefore uses, as sources of cold: the $CO_2$-enriched liquid recovered at the bottom of the column, the overhead vapour from the vessel V01 named "recycle stream R" at the outlet of the exchanger E01, and optionally the pure liquid $CO_2$ recovered at the bottom of the vessel V01 in the case where the vaporisation thereof is desired.

Figure 1:
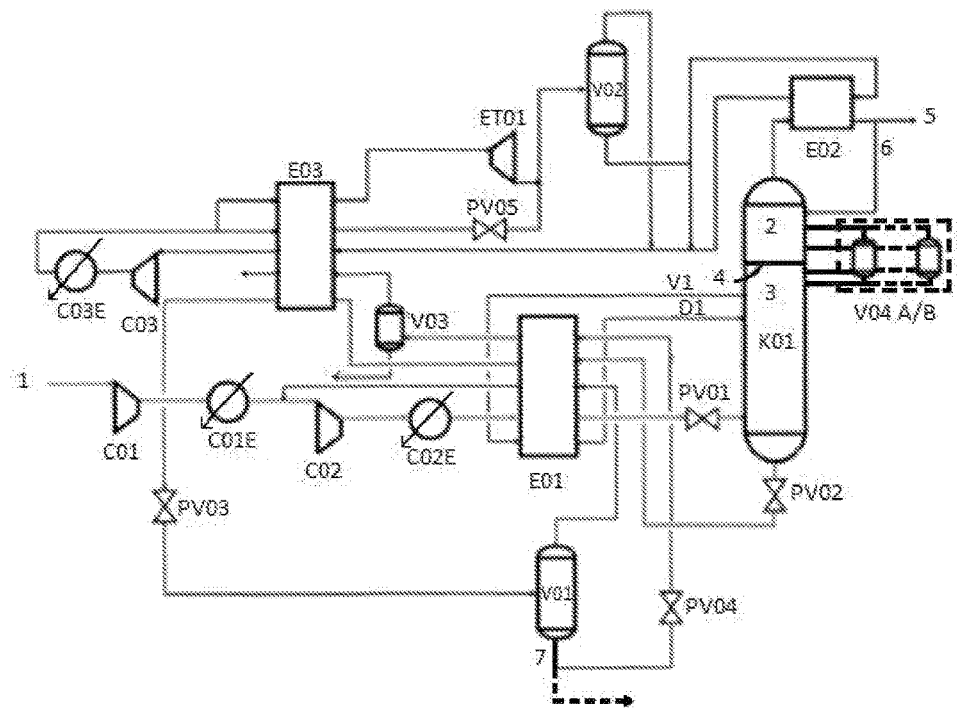
FIG. 1 illustrates a refrigeration circuit in accordance with one embodiment of the present invention.

The process requires an input of refrigeration power in order to operate. This input of cold is represented in FIG. 1 by the refrigeration circuit: it is composed of:
- a compressor C03 with cooler C03E;
- an exchanger E03 which cools the compressed fluid using the recycled refrigerant fluid and the cold recovered from the separation cycle;
- a turbine ET01 and a JT valve PV05, for the expansion of the refrigerant fluid and production of cold;
- a separator vessel V02 separating the vapour and liquid phases of the refrigerant fluid;
- an exchanger E02 which uses the liquid phase of the refrigerant fluid to liquefy the biomethane at the top of the distillation column.
- The refrigerant fluid used in the scheme is $CH_4$ but it can be replaced by other fluids such as $N_2$, $N_2+H_2$, inter alia.

This refrigeration cycle can be replaced by other sources of cold (depending on the amount of liquid biomethane to be produced). By way of example, but not exclusively:
- using a source of liquid nitrogen;
- by a Brayton cycle process.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A combined plant for cryogenic separation and liquefaction of methane and carbon dioxide in a biogas stream, comprising:
   a mixing means for mixing a biogas stream with a recycle gas stream, thereby producing a mixed biogas stream,
   a compressor for compressing the mixed biogas stream to a pressure suitable for distillation, thereby producing a compressed stream,
   a first exchanger for cooling the compressed mixture, thereby producing a cooled stream,
   a distillation column, comprising a top and a bottom, configured to be supplied with the cooled stream and configured to produce a methane stream at the top and a $CO_2$-enriched liquid stream at the bottom,
   a second exchanger for liquefying the methane stream, thereby producing a liquefied methane stream,
   a separating means for separating the liquefied methane stream into two portions: a "reflux" portion and a "product" portion,
   an expanding means for expanding the $CO_2$-enriched liquid stream thereby producing an expanded $CO_2$-enriched liquid stream, and a heating means for heating the expanded $CO_2$-enriched liquid stream, thereby producing a heated $CO_2$-enriched stream, and for recovering the cold from the expanded $CO_2$-enriched liquid stream, and
   a separator vessel for receiving the heated $CO_2$-enriched stream and for producing an overhead vapour stream and a liquid $CO_2$ stream,
   a means for withdrawing a vapour stream from an intermediate stage of the distillation column,
   a condensing means for partially condensing the vapour stream and producing a two-phase stream,
   wherein
   the mixing means is configured such that the recycle gas stream corresponds to the overhead vapour stream recovered at the outlet of the separator vessel, and
   a cryogenic separation unit comprises:
      the distillation column comprising a cold section at the top of the distillation column and a hot section at the bottom of the distillation column,
      at least two containers external to the distillation column, configured to place in contact a liquid stream from the cold section and a vapour stream rising from the hot section and for trapping solid $CO_2$, and
      a device for regenerating the at least two external containers, comprising an extracting means for extracting a fluid from the distillation column which is configured to liquefy the solid $CO_2$, a means for introducing this fluid into the at least two external containers in regeneration thereby melting the solid $CO_2$ and a means for reintroducing the resulting liquid $CO_2$-vapour mixture into the distillation column.

2. The plant according to claim 1, further comprising, upstream of the mixing means, a compressing means for compressing the biogas stream to the pressure of the recycle gas stream.

* * * * *